United States Patent [19]

Farr

[11] Patent Number: 5,145,323
[45] Date of Patent: Sep. 8, 1992

[54] LIQUID LEVEL CONTROL WITH CAPACITIVE SENSORS

[75] Inventor: James B. Farr, Ann Arbor, Mich.

[73] Assignee: Tecumseh Products Company, Tecumseh, Mich.

[21] Appl. No.: 618,164

[22] Filed: Nov. 26, 1990

[51] Int. Cl.⁵ .............................................. F04D 27/00
[52] U.S. Cl. ................................... 417/36; 417/18; 417/32; 417/44
[58] Field of Search ......................... 417/18, 32, 36, 44

[56] References Cited

U.S. PATENT DOCUMENTS

| | | | |
|---|---|---|---|
| 2,409,073 | 10/1946 | Sias et al. | |
| 2,529,015 | 11/1950 | Goudime-Levkovitsch et al. | |
| 2,570,218 | 10/1951 | Draganjac | 73/304 |
| 2,852,937 | 9/1958 | Maze | 73/304 |
| 2,863,472 | 12/1958 | Vacoles et al. | 137/392 |
| 3,073,160 | 1/1963 | Shawhan | 73/304 |
| 3,282,468 | 11/1966 | Karlen | 417/40 |
| 3,375,716 | 4/1968 | Hersch | 73/304 |
| 3,391,547 | 7/1968 | Kingston | 62/218 |
| 3,472,168 | 10/1969 | Inoue et al. | 417/44 |
| 3,544,236 | 3/1969 | Brookmire | 417/32 |
| 3,588,859 | 6/1971 | Petree | 340/244 |
| 3,800,205 | 3/1974 | Zalar | 417/36 |
| 4,171,186 | 10/1979 | Chapman | 417/40 |
| 4,171,932 | 10/1979 | Miller | 417/36 |
| 4,244,385 | 1/1981 | Hotine | 137/1 |
| 4,245,188 | 1/1981 | Rottmar | 73/304 C |
| 4,600,844 | 7/1986 | Atkins | 307/118 |
| 4,780,705 | 10/1988 | Beane | 340/620 |
| 4,881,873 | 11/1989 | Smith et al. | 417/36 |

Primary Examiner—Richard A. Bertsch
Assistant Examiner—David W. Scheuermann
Attorney, Agent, or Firm—Baker & Daniels

[57] ABSTRACT

The present invention is a liquid level control system for selectively activating and deactivating a pump according to the liquid level indicated by capacitive sensors. Activating circuitry starts the pump motor when both upper and lower sensors indicate the presence of liquid. The pump motor continues operation until both of the capacitive sensors indicate the absence of liquid, in which case the pump is shut off. The circuitry of the present invention operates reliably over a wide range of operating conditions.

19 Claims, 2 Drawing Sheets

LIQUID LEVEL CONTROL WITH CAPACITIVE SENSORS

BACKGROUND OF THE INVENTION

The present invention relates to control circuits for pump motors. More specifically, the field of the invention is that of liquid level control circuits which automatically maintain the liquid level within a predetermined range.

In sump and water tanks, for example, the liquid level should be maintained within a predetermined range for proper functioning of the tank. Many prior art devices automatically control the liquid level within the tank by activating a pump when the liquid rises above a first predetermined level and deactivating the pump when the liquid level falls below a second predetermined level. Some of the prior art devices use mechanical or moving parts such as mechanical switches operated by rubber diaphragms, springs, rods, floats, or balls, all of which may tend to wear out or malfunction over time.

Other prior art devices use electrical or optical probes positioned within the tank to determine the liquid level and control the pump accordingly. For example, self-heating thermistors or conductivity probes may be used. However, such prior art systems using probes may be sensitive to humidity, moisture, changing temperatures, and varying voltage levels in the sensing circuit, all of which may produce erroneous results and subject the probes to wear. Also, contamination of the probes may adversely effect their performance. The probes and their associated circuitry may be adjusted to improve performance, but making the adjustments may be inconvenient and expensive.

What is needed is a liquid level control which reliably operates without the need for adjustment.

Also needed is a liquid level control which minimizes operating problems associated with contamination and mechanical wear.

A further need exists for a liquid level control which minimizes inaccuracies associated with varying temperatures.

SUMMARY OF THE INVENTION

The present invention is a liquid level control system utilizing capacitive sensors which avoids the aforementioned problems. Activating circuitry starts the pump motor when both upper and lower sensors indicate the presence of liquid. The pump motor continues operation until both of the capacitive sensors indicate the absence of liquid, in which case the pump is shut off. The circuitry of the present invention operates reliably over a wide range of operating conditions.

One construction of a capacitive sensor includes having one electrode as a metal plate disposed in a plastic box enclosing the circuitry, and the other electrode as the pump case. This provides a simple and reliable capacitive sensor which is generally isolated from any problems of contamination or mechanical failure. Alternatively, a capacitive sensor may include an insulated wire capable of mounting at any position in the tank.

One portion of the circuitry includes thermistors which can turn off the pump motor when a predetermined temperature is reached. This is particularly important when the system is operated in a circulating mode wherein the liquid pumped out of the tank is returned to the tank and the water temperature becomes increasingly higher.

Another portion of the circuitry maintains voltages at switch terminals at predetermined levels so that false triggering of the activating circuitry does not occur, which can be particularly troublesome at high operating temperatures.

The present invention is, in one form, an apparatus for controlling liquid levels comprising a pump, a motor drivingly connected to the pump, first and second sensors, and an activation circuitry. The first sensor detects the presence of liquid and at a first position, producing a first signal indicative of the presence of liquid at that first position. The second sensor detects the presence of liquid and at a second position, producing a second signal indicative of the presence of liquid at the second position. An activating device is operably coupled to the first and second sensors, and starts the motor to drive the pump when both of the first and second signals are produced. The activating devices continues operation of the motor while at least one of the first and second signals are being produced. Finally, the activating device stops the motor when both the first and second signals are no longer produced. The first and second sensors each include a capacitive circuit having two capacitive electrodes.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplifications are not to be construed as limiting the scope of the invention in any manner.

DESCRIPTION OF THE PREFERRED EMBODIMENT

Figure 1:
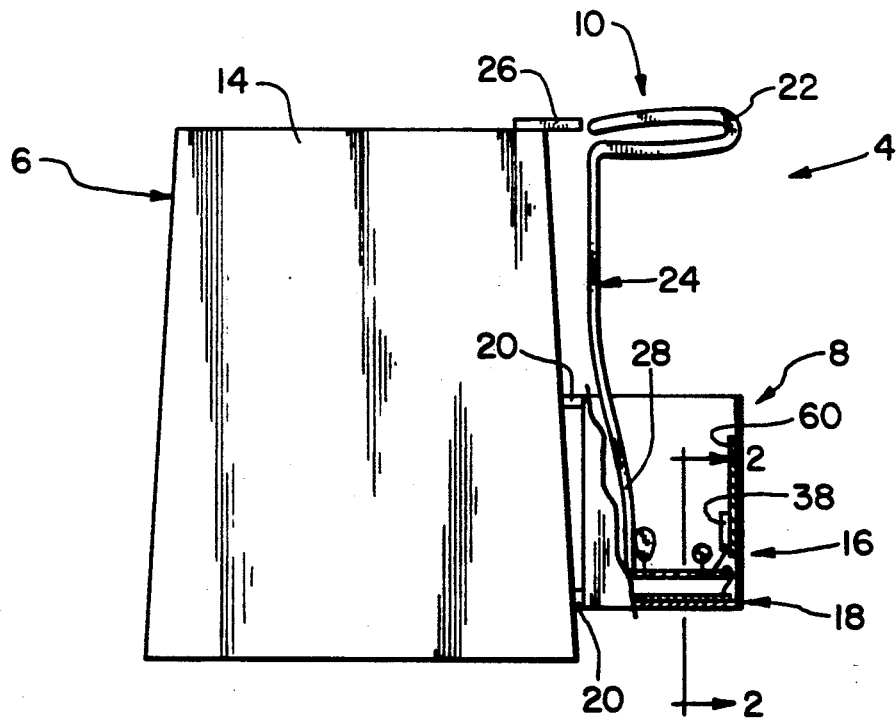
FIG. 1 is a side, elevational view, in partial cut-away, of the liquid control system of the present invention.

The present invention comprises a liquid level control system adapted for use in a tank or other vessel in which the level of liquid is to be controlled. As depicted in FIG. 1, control system 4 includes pump 6, which can be a submersible sump pump, controller box 8, and upper sensor 10. The water in which control system 4 is immersed acts as a conductive medium. Pump 6 is disposed within the tank (not shown) in which the liquid level is to be controlled, and includes insulated motor 12 (see FIG. 3) located within pump casing 14. Controller box 8 is also disposed within the tank, and is preferably attached to casing 14. Circuit board assembly 16 and lower sensor 18 are disposed within box 8. Box 8 is spaced away from pump casing 14 by mounting posts 20, and preferably box 8 is made of a dielectric material. Upper sensor 10 includes sensor portion 22 of insulated wire 24 which is vertically adjustable at an upper portion of pump casing 14 by means of mounting bracket 26. Sensor portion 22 is electrically coupled to circuit board 16 via connecting portion 28 of insulated wire 24.

Figure 2:
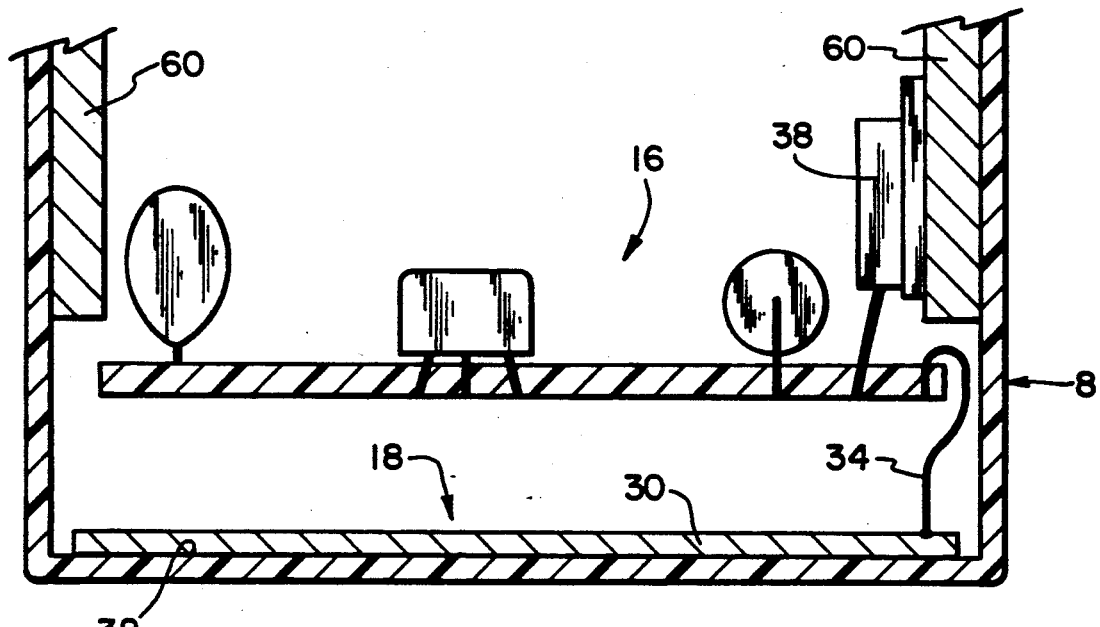
FIG. 2 is an enlarged cross-sectional view taken along view lines 2—2 of FIG. 1.

FIG. 2 shows the arrangement of lower sensor 18. Metal plate 30 is located on bottom wall 32 of box 8 and is separated from any liquid adjacent bottom wall 32 by the dielectric barrier formed by the material of box 8, which is preferably plastic or the like. Printed circuit board assembly 16 is secured vertically above plate 30 and is connected to metal plate 30 by electrical wire 34. Epoxy potting compound exists between circuit board assembly 16 and metal plate 30 so that assembly 16 and plate 30 are electrically isolated.

Figure 3:
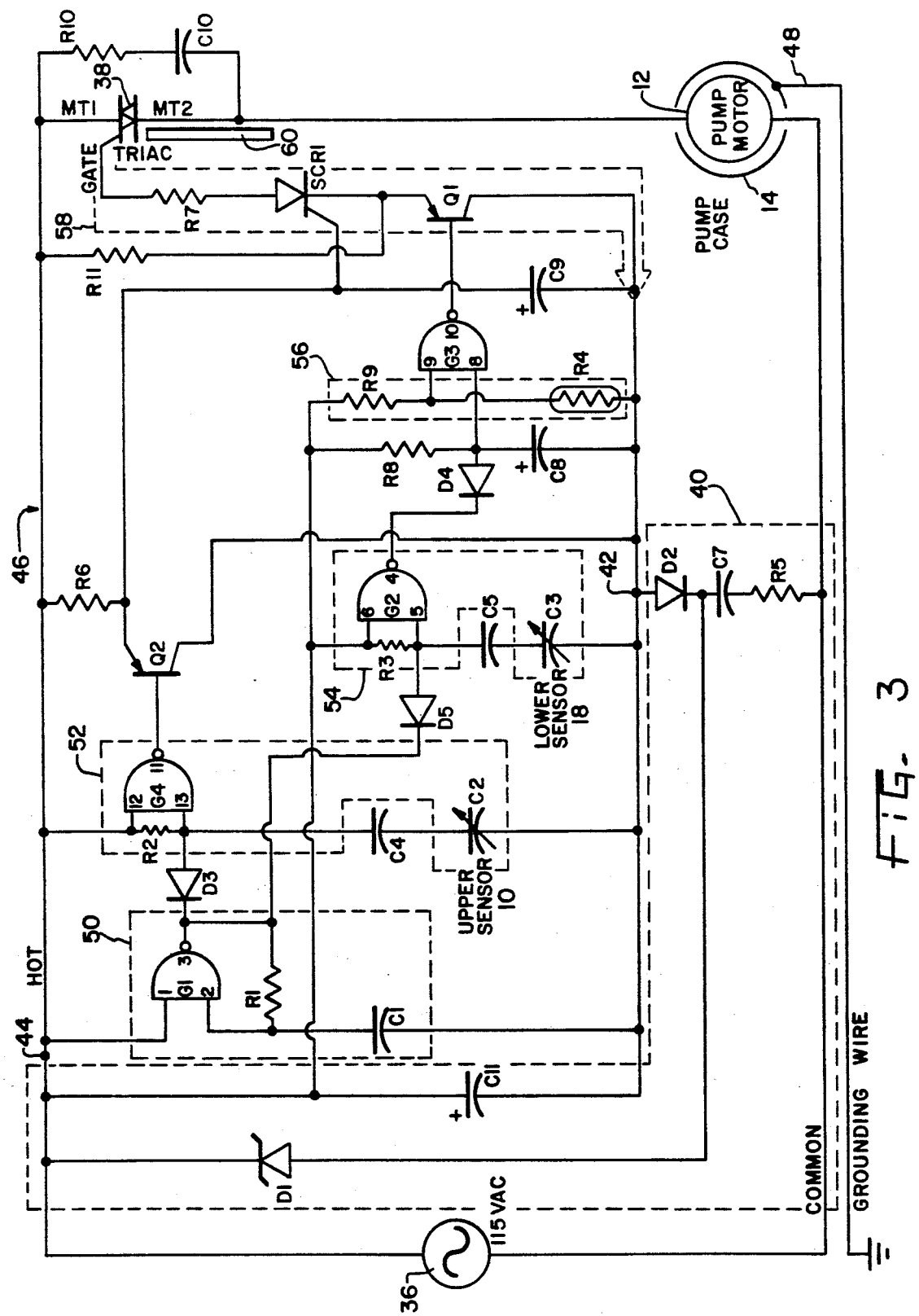
FIG. 3 is a schematic circuit diagram of the control circuitry of the present invention.

FIG. 3 shows the circuitry of the present invention, most of which is generally located on circuit board assembly 16. Alternating current (AC) power supply 36 is selectively electrically coupled to pump motor 12 by triac 38. Direct current (DC) power supply 40 converts alternating current from power supply 40 to a direct current bus between DC positive terminal 42 and DC negative terminal 44. Activating circuitry, referred to generally by numeral 46, is connected to the direct current bus and selectively activates triac 38 according to the states of upper and lower capacitive sensors C2 and C3 as described in more detail below. Grounding wire 48 is connected to pump case 14 to provide a ground for the AC circuit through pump motor 12. A more detailed description of the circuitry of the present invention is provided below by describing the arrangement and operation of activating circuitry 46.

Also shown in FIG. 3, activating circuitry 46 includes astable multivibrator 50 and monostable multivibrators 52 and 54. Astable multivibrator 50 includes NAND gate G1, resistor R1, and capacitor C1. NAND gate G1 has input pin 1 coupled to DC positive terminal 44, input pin 2 coupled to one terminal of resistor R1 and one terminal of capacitor C1, and output pin 3 coupled to the cathode of diode D3, the cathode of diode D5, and the other terminal of resistor R1. The other terminal of capacitor C1 is coupled to DC negative terminal 44.

Monostable multivibrator 52 includes NAND gate G4, resistor R2, and upper sensor capacitor C2. NAND gate G4 has input pin 12 coupled to DC positive terminal 44 and one terminal of resistor R2, input pin 13 coupled to the other terminal of resistor R2, the anode of diode D3, and the series circuit of capacitors C2 and C4, and output pin 11 coupled to the base of transistor Q2. The series circuit of capacitors C2 and C4 includes one terminal of capacitor C4 coupled to input pin 13 of NAND gate G4, the other terminal of capacitor C4 coupled to one terminal of capacitor C2, and the other terminal of capacitor coupled to DC negative terminal 42.

Monostable multivibrator 54 includes NAND gate G2, resistor R3, and lower sensor capacitor C3. NAND gate G2 has input pin 6 coupled to DC positive terminal 44 and one terminal of resistor R3, input pin 5 coupled to the other terminal of resistor R3, the anode of diode D4, and the series circuit of capacitors C3 and C5, and output pin 4 coupled to the cathode of diode D4. The series circuit of capacitors C3 and C5 includes one terminal of capacitor C5 coupled to input pin 5 of NAND gate G2, the other terminal of capacitor C5 coupled to one terminal of capacitor C3, and the other terminal of capacitor C3 coupled to DC negative terminal 42.

Capacitors C4 and C5 are not needed to achieve the desired functionality of monostable multivibrators 52 and 54. As a precautionary measure, however, capacitors C4 and C5 are included in activating circuitry 46 to limit the amount of current which could potentially pass through the liquid in case that insulation on any of the sensor wires is damaged.

NAND gate G3 is coupled to monostable multivibrator 54 via diode D4, wherein the anode of diode D4 is coupled to input pin 8 of NAND gate G3. Resistor R8 is also coupled between DC positive terminal 44 and input pin 8, and capacitor C8 is coupled between input pin 8 and DC negative terminal 42. Input pin 9 of NAND gate G3 is coupled to voltage divider 56, which includes resistor R9 coupled between DC positive terminal 44 and input pin 9, and negative temperature coefficient (NTC) thermistor R4 coupled between input pin 9 and DC negative terminal 42. Output pin 10 of NAND gate G3 is coupled to the base of transistor Q1.

Transistor Q1 is disposed in negative gate current path circuit 58 to switch the gate current of triac 38. Triac 38 conducts AC line current when current flows through negative gate current path circuit 58. Current path circuit 58 includes the gate of triac 38 which is coupled to one terminal of resistor R7, the other terminal of resistor R7 which is then coupled with the anode of SCR1, the cathode of SCR1 which is then coupled to the emitter of transistor Q1, and the collector of transistor Q1 which is finally coupled to DC negative terminal 42. Further, resistor R11 has one terminal coupled to DC positive terminal 44 and the other terminal coupled to the cathode of SCR1 and the emitter of transistor Q1 for maintaining the emitter of transistor Q1 at several tenths of a volt above DC negative terminal 42 when Q1 is in a conductive state.

SCR1 also switches current path circuit 58 by means of capacitor C9, resistor R6, and transistor Q2. Capacitor C9 has one terminal coupled to DC negative terminal 42 and the other terminal coupled to the gate of SCR1, one terminal of resistor R6, and the emitter of transistor Q2. This arrangement allows capacitor C9 to charge from DC positive terminal 44 through resistor R6, and discharge when the base of transistor Q2 is conducting to the output terminal of NAND gate G4, through the collector of transistor Q2 which is coupled to DC negative terminal 42. When the base of transistor Q2 is not conducting, voltage on capacitor C9 rises to a voltage sufficient to trigger the gate of SCR1, thus closing current path circuit 58 from the gate of triac 38 to the emitter of transistor Q1.

DC power supply 40 includes capacitor C11, Zener diode D1, diode D2, capacitor C7, and resistor R5. DC positive terminal 44 is the same as the AC line labeled HOT, and DC negative terminal 42 is the negative terminal of electrolytic capacitor C11. Capacitor C11 is coupled between DC positive terminal 44 and DC negative terminal 42. The cathode of Zener diode D1 is coupled to DC positive terminal 44 and the anode of Zener diode D1 is coupled to the cathode of diode D2 and one terminal of capacitor C7. The anode of diode D2 is coupled to DC negative terminal 42, while the other terminal of capacitor C7 is coupled to one terminal of resistor R5. The other terminal of resistor R5 is coupled to the common return line (labeled COMMON) of power supply 36.

In accordance with the present invention, upper and lower sensors 10 and 18, respectively, comprise capacitive sensors C2 and C3, respectively. Upper capacitive sensor C2 includes the insulation on sensor portion 22 of insulated wire 24 which forms the electrolyte of capacitor C2, and the insulation on lead wires or other conductors also forms part of the electrolyte of capacitor C2. Lower capacitive sensor C3 has metal plate 30 as one electrode and pump casing 14 (with the insulated motor and circuit lead wires immersed in water) as the other electrode. Alternatively, lower capacitive sensor C3 may have an insulated wire (similar to sensor portion 22 of upper sensor 10) as one electrode and pump casing 14 (with the insulated motor and circuit lead wires) as the other electrode. With the structure of upper and lower capacitive sensors C2 and C3, the sensing circuitry is much less vulnerable to physical contamination or physical wear.

In operation, the liquid level rises from an empty state due to external conditions, but pump 6 does not operate until after upper sensor 10 is submerged in liquid. When lower sensor 18 is covered by liquid, the capacitance of capacitive sensor C3 is sufficiently large that the voltage at input pin 5 of gate G2 does not exceed the trip threshold so that output pin 4 of gate G2 stays high. Diode D4 does not allow capacitor C8 to discharge, and resistor R8 is able to charge capacitor C8 above the trip voltage of gate G3 at input pin 8, causing output pin 10 of gate G3 to drop to a low voltage which is only slightly above negative DC terminal 42. Pin 10 of gate G3 can then receive current from the base terminal of transistor Q1 and activating circuitry 46 is then in an enabled state.

As the water level rises and reaches upper sensor 10, the capacitance of capacitive sensor C2 increases to a value such that the voltage at pin 13 of gate G4 does not exceed the trip threshold voltage. Consequently, pin 11 of gate G4 stays at a high voltage preventing transistor Q2 from conducting. Capacitor C9 charges through resistor R6, and as the voltage on C9 rises slightly above 1 volt, the gate of SCR1 receives a triggering current. Therefore, SCR1 conducts current which passes through a path including main terminal 1 (MT1) and the gate of triac 38, resistor R7, the anode-cathode of SCR1, and the emitter-collector of transistor Q1. Current path circuit 58 and resulting negative triac gate current causes triac 38 to conduct AC current through motor 12.

In operation, the liquid level drops from a full state wherein both capacitive sensors C2 and C3 are immersed and motor 12 is actively driving pump 6. Eventually, an electrode of the upper capacitive sensor C2 is uncovered, and pin 11 of gate G4 is tripped low toward the end of the AC cycle of astable multivibrator 50. Transistor Q2 conducts, periodically discharging capacitor C9. Resistor R11 causes transistor Q2 to have an emitter voltage about several tenths above that of DC negative terminal 42. The time constant of the circuit comprising resistor R6 and capacitor C9 is very large in comparison with discharge events occurring through transistor Q2 so that voltage on capacitor C9 is kept in a low state, removing the gate current source for SCR1. However, due to the SCR's latching characteristics, SCR1 remains in conduction without need for gate current and therefore triac 38 continues to supply current to the pump motor. Further, the gate voltage of SCR1 is the difference between the emitter voltage of transistor Q2 and the emitter voltage of transistor Q1. This voltage difference is a very low value when no gating current is desired. Since this gives the effect of a shorted gate-cathode, SCR1 may operate at high temperatures while eliminating the occurrence of false triggering.

After the water level has been pumped low enough to partially uncover an electrode of lower capacitive sensor C3, pin 4 of gate G2 drops to a low voltage near the end of the astable multivibrator cycle. With pin 4 of gate G2 low, capacitor C8 discharges thus causing the output pin 10 of gate G3 to go high. This turns off transistor Q1, thereby turning off SCR1 by decreasing its anode current to a value below its holding current. Without a triac gate current through SCR1, triac 38 drops out of conduction at the next zero crossing of the main terminals' current.

Resistor R9 and NTC thermistor R4 form voltage divider circuit 56 with input to pin 9 of gate G3. Thermistor R4 is placed in thermal contact with the case (not shown) of triac 38. If triac 38 exceeds a predetermined temperature and becomes overheated, thermistor R4 drops in resistance and lowers the voltage at pin 9 of gate G3 below the tip-off voltage, causing pin 10 of gate G3 to go high and thereby turning off Q1. Alternatively, R9 may be a positive temperature coefficient (PTC) thermistor in thermal contact with triac 38, and resistor R4 would then be have a fixed resistance.

Triac 38 is attached to heat spreader 60 and is cooled by the liquid which surrounds the control box 8 and pump 6. Pump 6 may operate in a circulating mode whereby the liquid discharge of pump 6 is returned to the tank. In the circulating mode, the liquid temperature continually rises and may result in failure of motor 12 or activating circuitry 46 unless the heating process is interrupted. Thus, the thermistor in conjunction with input pin 9 of gate G3 forms both a motor protector and a circuit protector.

The values of the circuit elements shown in FIG. 3 are given below in Table 1:

TABLE 1

| Element | Value |
|---|---|
| R1 | 220KΩ |
| R2 | 100KΩ |
| R3 | 100KΩ |
| R4 | NTC Thermistor (Keystone) RL1006-135.2K-138-D1 |
| R5 | 47Ω |
| R6 | 33KΩ |
| R7 | 220Ω |
| R8 | 100KΩ |
| R9 | 18KΩ |
| R10 | 220Ω |
| R11 | 18KΩ |
| C1 | 150 pf |
| C2 | 50 pf |
| C3 | 50 pf |
| C4 | 0.0047 μf, 200 v |
| C5 | 0.0047 μf, 200 v |
| C7 | 2.0 μf, 200 v |
| C8 | 2.2 μf, 16 v |
| C9 | 2.2 μf, 16 v |
| C10 | 0.1 μf, 200 v |
| C11 | 470 μf, 16 v |
| Q1,Q2 | 2N4126 |
| SCR1 | C103 |
| TRIAC | 8 Amp, 400 v, Iso Tab; (Teccor) Q4008L4 |
| G1,G2,G3,G4 | Quad 2-Input NAND Schmitt Trigger CD4093BE |
| D1 | 12 v, 1 w Zener IN4742 |
| D2 | IN4001 |
| D3 | IN4001 |
| D4 | IN4001 |
| D5 | IN4001 |

The attributes of NTC thermistor R4 include a resistance of 250 KΩ at 25° C. with a resistance ratio of 12 in the range of 0° C. to 50° C. If the alternative embodiment having R9 as a PTC thermistor is used, R9 would preferably have attributes including a resistance of 50 Ω at 25° C. with a transition temperature of 70° C. (for example, using a Keystone RL3006-50-70-25-PTO), and R4 would have a fixed resistance of 18 KΩ.

It should be understood that the signals generated by the capacitive sensing circuits that activate and deactivate the pump control circuitry can be of any form, such as voltage levels as disclosed, logic levels, polarity, current levels, etc. The present invention is not limited to the disclosed embodiment.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An apparatus for controlling liquid levels, said apparatus comprising:
    a pump including an outer case;
    a motor drivingly connected to said pump;
    first sensor means for detecting the presence of liquid and mounted at a first vertical position, said first sensor means producing a first signal indicative of the presence of liquid at said first position;
    second sensor means for detecting the presence of liquid and mounted at a second vertical position, which is different than said first vertical position, said second sensor means producing a second signal indicative of the presence of liquid at said second position; and
    means for activating said motor, said activating means operably coupled to said first and second sensor means, said activating means starting said motor to drive said pump when both of said first and second signals are produced by said first and second sensors, said activating means for continuing operation of said motor while at least one of said first and second signals are being produced, and said activating means stopping said motor when both said first and second signals are no longer produced;
    said first and second sensor means each including a capacitive circuit having two capacitive electrodes, one of said electrodes of said first and second sensor means including said pump outer case.

2. The system of claim 1 wherein at least one of said electrodes for one of said first and second sensor means is vertically moveable.

3. The system of claim 2 wherein said pump includes a bracket for mounting said vertically moveable electrode.

4. The system of claim 1 further comprising a dielectrically isolated box attached to said pump.

5. The system of claim 4 wherein at least one of said electrodes of one of said first and second sensor means includes a plate disposed within said box.

6. The system of claim 4 wherein said activating means includes circuitry disposed on a board within said box.

7. The system of claim 1 wherein said activating means includes means for stopping said motor when the temperature of said system exceeds a predetermined level.

8. The system of claim 1 wherein said activating means includes means for minimizing the occurrence of false triggering caused by high temperatures.

9. The system of claim 1 wherein said first sensor means includes a monostable multivibrator.

10. The system of claim 1 wherein said second sensor means includes a monostable multivibrator.

11. The system of claim 1 wherein said system further includes latching means for coupling said motor to a power source, said latching means including first, second, and gate terminals, said first and second terminals coupled in a series circuit relationship with said motor and the power source, said gate terminal coupled to said activating means, whereby said latching means closes said series circuit when activated by said activating means.

12. The system of claim 11 wherein said latching means further includes a switch means for maintaining said latching means in a closed state, said switch means coupled to said activating means whereby after said latching means closes said series circuit, said switch means maintains said latching means in said closed state when said activating means indicates at least one of said first and second signals are being produced.

13. The system of claim 12 wherein said activating means includes means for adjusting to ambient temperature changes, said adjusting means coupled to said switch means whereby the switching of said switch means is relatively unaffected.

14. The system of claim 13 wherein said adjusting means includes a divider having at least one non-unitary temperature coefficient resistor, said divider coupled to said switch means whereby the switching of said switch means is relatively unaffected by temperature changes of said activating means.

15. The system of claim 12 wherein said latching means further includes enabling means for enabling the closure of said latching means, said enabling means coupled to said activating means whereby after neither of said first and second signals are produced, said enabling means allows the closure of said series circuit when said activating means indicates the higher vertically mounted one of said first and second sensor means are producing one of said first and second signals.

16. An apparatus for controlling liquid levels, said apparatus comprising:
    a pump;
    a motor drivingly connected to said pump;
    an upper sensor means for detecting the presence of liquid and mounted at a first vertical position, said upper sensor means producing a first signal indicative of the presence of liquid at said first position;
    a lower sensor means for detecting the presence of liquid and mounted at a second vertical position, which is vertically below said first vertical position, said lower sensor means producing a second signal indicative of the presence of liquid at said second position;
    means for latching said motor in an active state for driving said pump, and
    means for activating said latching means, said activating means operably coupled to said upper and lower sensor means, said activating means including means for starting activation of said motor when both of said first and second signals are produced by said first and second sensors, said activating means including means for continuing activation of said motor while at least one of said first and second signals are being produced, and said activating means including means for stopping activation of said motor when both said first and second signals are no longer produced;

said continuing means including a divider circuit having at least one non-unitary temperature coefficient resistor and a gating means coupled to said divider circuit, said gating means for operably activating said latching means whereby changes in ambient temperature do not affect the activation of said motor.

17. The system of claim 16 wherein said upper sensor means includes a monostable multivibrator having an output coupled to said starting means.

18. The system of claim 16 wherein said lower sensor means includes a monostable multivibrator having an output coupled to said continuing means.

19. An apparatus for controlling liquid levels, said apparatus comprising:

a pump;

a motor drivingly connected to said pump;

first sensor means for detecting the presence of liquid and mounted at a first vertical position, said first sensor means producing a first signal indicative of the presence of liquid at said first position;

second senor means for detecting the presence of liquid and mounted at a second vertical position, which is different than said first vertical position, said second sensor means producing a second signal indicative of the presence of liquid at said second position; and means for activating said motor, said activating means operably coupled to said first and second sensor means, said activating means starting said motor to drive said pump when both of said first and second signals are produced by said first and second sensors, said activating means for continuing operation of said motor while at least one of said first and second signals are being produced, and said activating means stopping said motor when both said first and second signals are no longer produced;

said first and second sensor means each including a capacitive circuit having two capacitive electrodes;

said activating means including means for minimizing the occurrence of false triggering caused by high temperatures.

* * * * *